(12) United States Patent
Cunningham et al.

(10) Patent No.: US 11,984,781 B2
(45) Date of Patent: May 14, 2024

(54) ELECTRIC MACHINE, IN PARTICULAR FOR A VEHICLE

(71) Applicant: Mahle International GmbH, Stuttgart (DE)

(72) Inventors: John Cunningham, Muxton Telford West Midlands (DE); Philip Grabherr, Stuttgart (DE); Ian Webb, Telford West Midlands (GB); Tim Male, Telford West Midlands (GB); Stojan Markic, Kojsko (SI); Graham Sentance, Stanford Bridge Yorkshire (GB); Peter Sever, Murska Sobota (SI); Josef Sonntag, Nuertingen (DE); Jon Witcombe, Telford Schropshire (GB)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 589 days.

(21) Appl. No.: 16/892,259

(22) Filed: Jun. 3, 2020

(65) Prior Publication Data
US 2020/0295617 A1 Sep. 17, 2020

Related U.S. Application Data

(63) Continuation of application No. PCT/EP2018/081574, filed on Nov. 16, 2018.

(30) Foreign Application Priority Data

Dec. 4, 2017 (DE) ...................... 10 2017 221 803.7

(51) Int. Cl.
*H02K 3/24* (2006.01)
*H02K 1/20* (2006.01)
*B60K 1/00* (2006.01)

(52) U.S. Cl.
CPC .................. *H02K 3/24* (2013.01); *H02K 1/20* (2013.01); *B60K 1/00* (2013.01)

(58) Field of Classification Search
CPC .......... H02K 3/24; H02K 9/197; H02K 3/487; H02K 1/20; H02K 5/08; B60K 1/00
(Continued)

(56) References Cited

U.S. PATENT DOCUMENTS 2,390,130 A * 12/1945 Sigmund .................. H02K 1/20
                                                            310/54
3,249,775 A * 5/1966 Baylac ..................... H02K 3/22
                                                            310/86
(Continued)

FOREIGN PATENT DOCUMENTS

CN   101183805 A   5/2008
CN   102780289 A   11/2012
(Continued)

OTHER PUBLICATIONS

International Search Report of the European Patent Office PCT/EP2018/081574 (from which this application claims priority) dated Feb. 15, 2019 and English-language translation thereof.
(Continued)

*Primary Examiner* — Alex W Mok
(74) *Attorney, Agent, or Firm* — Barnes & Thornburg LLP

(57) ABSTRACT

An electric machine includes a rotor rotatable about a rotational axis, by which an axial direction is defined, and a stator with stator windings, a coolant distributor space and a coolant collector space. The coolant distributor space communicates fluidically with the coolant collector space to cool the stator windings with a cooling duct. The stator includes stator teeth supporting the stator windings and protruding radially inward from a stator body of the stator.

(Continued)

A stator groove is formed between two stator teeth which has a radially outer groove zone extending radially inward away from the stator body into a radially inner groove zone, the radially inner zone width of which is smaller than the radially outer zone width, when measured along the circumferential direction, of the radially outer groove zone. At least one stator winding is embedded, for thermal coupling, into an electrically insulating plastic arranged in the stator groove.

32 Claims, 6 Drawing Sheets

(58) Field of Classification Search
USPC .......................................................... 310/65
See application file for complete search history.

(56) References Cited

U.S. PATENT DOCUMENTS

| | | | | |
|---|---|---|---|---|
| 3,457,439 | A | * | 7/1969 | Gering ..................... H02K 9/18 310/52 |
| 4,396,847 | A | * | 8/1983 | Weghaupt .............. H02K 9/225 310/52 |
| 5,214,325 | A | | 5/1993 | Matson et al. |
| 5,973,427 | A | | 10/1999 | Suzuki et al. |
| 6,856,053 | B2 | * | 2/2005 | LeFlem .................. H02K 9/197 310/194 |
| 7,538,457 | B2 | * | 5/2009 | Holmes ................... H02K 9/19 310/57 |
| 7,683,509 | B2 | * | 3/2010 | Neal ....................... H02K 9/227 310/58 |
| 7,705,495 | B2 | | 4/2010 | Alfermann et al. |
| 9,518,477 | B2 | | 12/2016 | Karlsson et al. |
| 9,653,955 | B2 | | 5/2017 | Gundtoft et al. |
| 2008/0042498 | A1 | | 2/2008 | Beer |
| 2012/0091838 | A1 | * | 4/2012 | Miyamoto ............. H02K 5/203 310/54 |
| 2014/0346778 | A1 | * | 11/2014 | Gabeiras ................ H02K 5/203 290/55 |
| 2015/0381010 | A1 | * | 12/2015 | Kobes ...................... H02K 1/04 29/598 |

FOREIGN PATENT DOCUMENTS

| | | |
|---|---|---|
| CN | 102832726 A | 12/2012 |
| CN | 102906972 A | 1/2013 |
| CN | 203352307 U | 12/2013 |
| DE | 19813160 C2 | 2/2001 |
| DE | 102006029803 A1 | 1/2008 |
| DE | 102007054364 A1 | 5/2008 |
| JP | 10271738 A | 10/1998 |
| WO | 2000001053 A1 | 1/2000 |

OTHER PUBLICATIONS

Written Opinion of the International Searching Authority of the European Patent Office in PCT/EP2018/081574 (from which this application claims priority) dated Feb. 15, 2019 and English-language translation thereof.

Chinese Search Report dated Oct. 27, 2021 of Chinese counterpart application No. CN 2018800784388 and English language translation thereof.

Office Action dated Nov. 5, 2021 issued in Chinese counterpart application No. 201880078438.8 and English-language translation thereof.

* cited by examiner

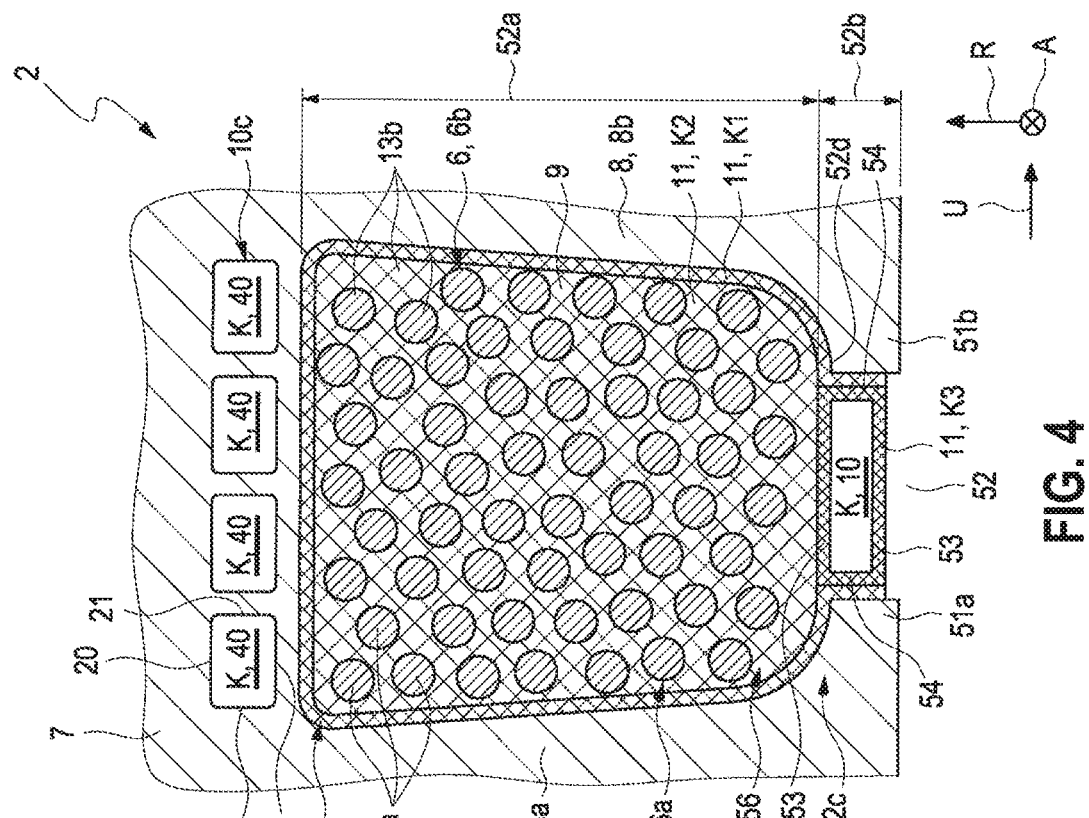
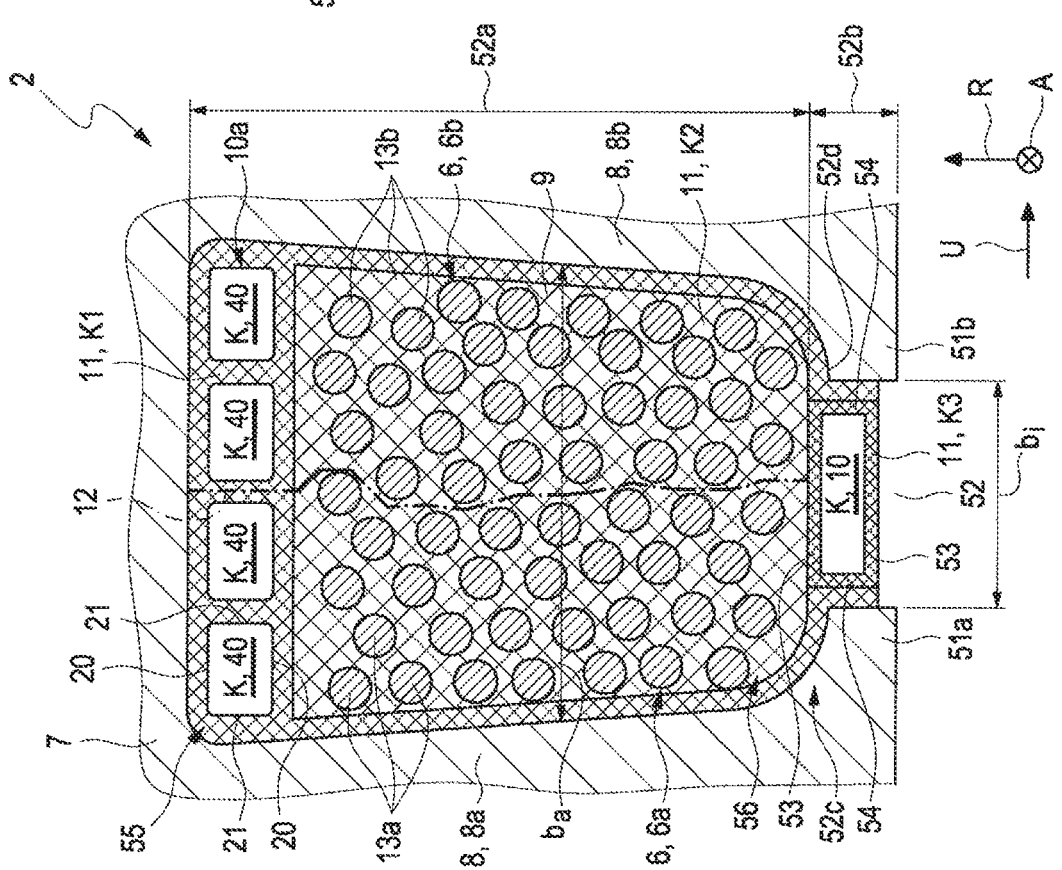

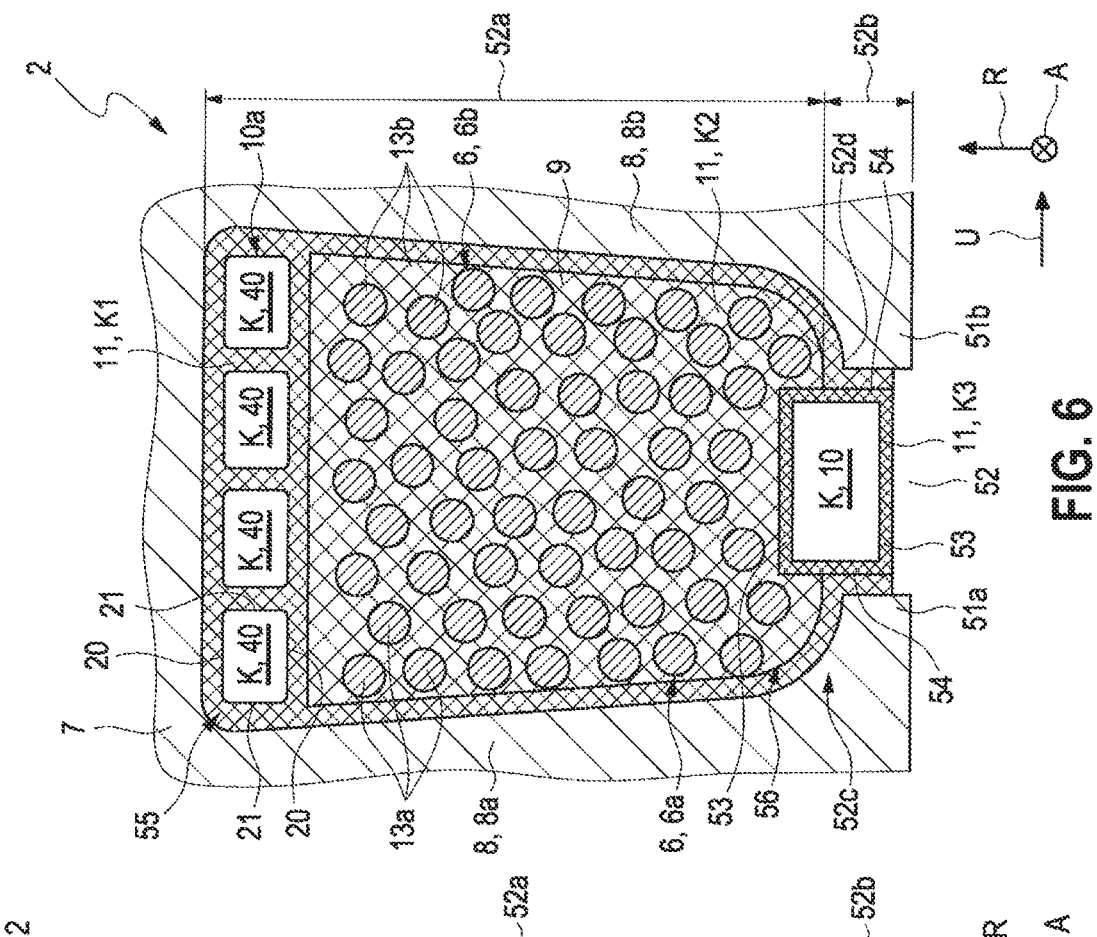
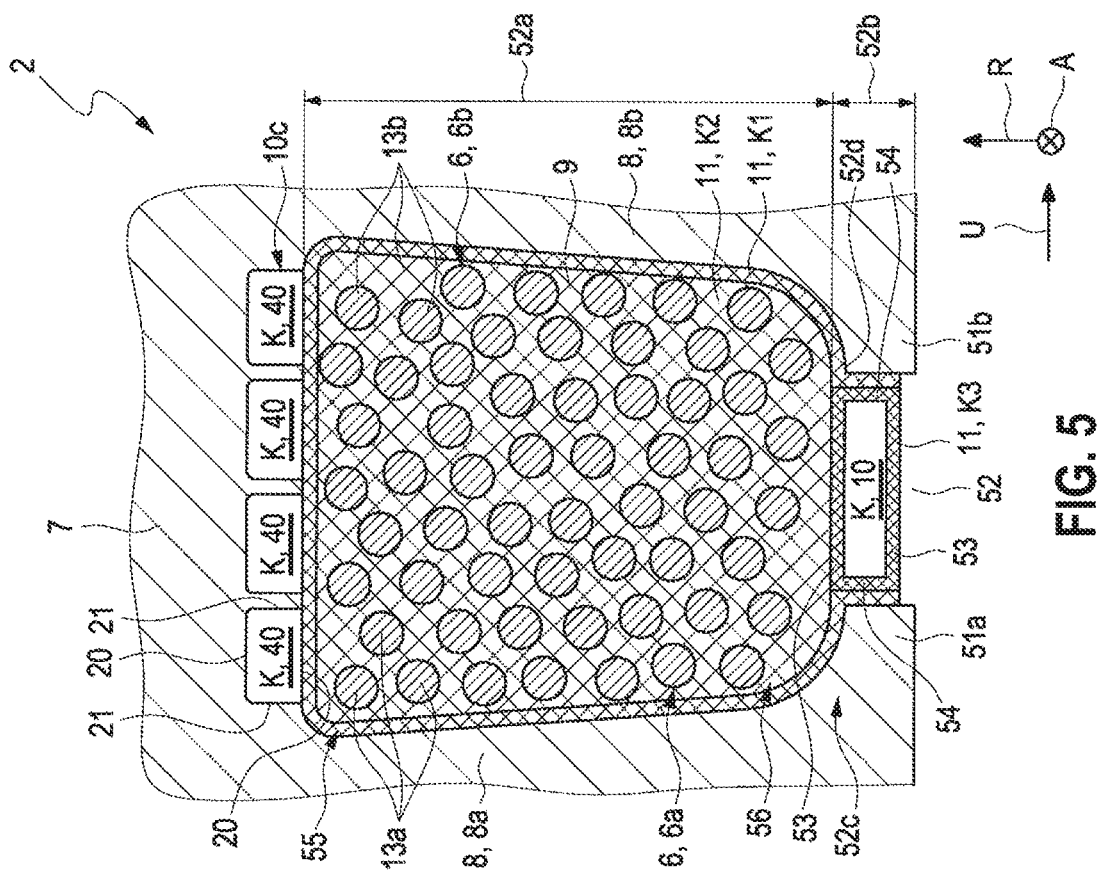

ELECTRIC MACHINE, IN PARTICULAR FOR A VEHICLE

CROSS REFERENCE TO RELATED APPLICATIONS

This application is a continuation application of international patent application PCT/EP2018/081574, filed Nov. 16, 2018, designating the United States and claiming priority to German application DE 10 2017 221 803.7, filed Dec. 4, 2017, and the entire content of both applications is incorporated herein by reference.

TECHNICAL FIELD

The disclosure relates to an electric machine, in particular for a vehicle, and to a vehicle having such a machine.

BACKGROUND

Such an electric machine can generally be an electric motor or a generator. The electric machine can be designed as an external rotor machine or as an internal rotor machine.

A generic machine is known for example from U.S. Pat. No. 5,214,325. It includes a housing surrounding an interior space and which includes a shell circulating in a circumferential direction of the housing and radially bounding the interior space, axially at one side a rear sidewall axially bounding the interior space and axially on the other side a front sidewall axially bounding the interior space. A stator of the machine is connected to the shell in a fixed manner. In the stator, a rotor of the machine is arranged, wherein a rotor shaft of the rotor is rotatably mounted on the front sidewall via a front shaft bearing.

Typically, the stator of a conventional electric machine includes stator windings which, during the operation of the machine, are electrically energised. In the process heat is generated which for avoiding overheating and damage or even destruction of the stator connected to this has to be dissipated. For this purpose, it is known from conventional electric machines to equip these with a cooling device for cooling the stator, in particular the said stator windings. Such a cooling device includes one or more cooling passages through which a coolant flows and which are arranged in the stator in the vicinity of the stator windings. By way of heat transfer from the stator windings to the coolant, heat can be dissipated from the stator.

Here it proves to be disadvantageous that an efficient heat transfer from the stator to the coolant flowing through the respective cooling passage involves substantial structural expenditure. However, this has a disadvantageous effect on the production costs of the electric machine.

SUMMARY

It is therefore an object of the present disclosure to provide an improved electric machine with which this disadvantage is largely or even entirely eliminated. In particular, an improved electric machine which includes an improved cooling of the stator windings of the stator with low production costs at the same time.

This object is achieved by an electric machine, in particular for a vehicle, an a vehicle, in particular motor vehicle, having at least one electric machine.

Accordingly, it is a general idea of the disclosure to embed the stator windings of an electric machine, for cooling the stator windings, in an electrically insulating plastic which at the same time also bounds a cooling passage to be flowed through by a coolant. Thus, the plastic can act as heat-transferring medium for transferring heat from the stator windings to the coolant flowing through a cooling passage and on the other hand as electrical insulator for the stator windings. In this way, a particularly good heat transfer between the stator windings and the coolant conducted through the cooling passage is established.

The direct thermal coupling of the cooling passage with the coolant to the stator windings to be cooled with the help of the embedding of the stator winding(s) in an electrically insulating plastic that is substantial for the disclosure leads to a particularly effective cooling of the stator windings. Thus, it can also be ensured during a high-load operation of the electric machine that the waste heat incurred can be dissipated from the stator. A damage or even destruction of the electric machine through overheating of the stator can thus be avoided. By using an electrically insulating plastic, it is additionally ensured that the stator windings to be cooled are not electrically short-circuited by the plastic in an undesirable way.

According to an aspect of the disclosure, the cooling passage is arranged at least in portions in a stator groove between two adjacent stator teeth of the stator. Here, the stator slot merges from a radially outer slot zone radially to the inside into a radially inner slot zone, whose radially inner zone width measured along the circumferential direction is smaller than the outer zone width of the radially outer slot zone measured along the circumferential direction. The cooling passage is arranged in a cross-section perpendicularly to the axial direction in the region of a transition from the radially outer to the radially inner slot zone where it is bounded by the electrically insulating plastic. The arrangement of the cooling passage in the region of the said transition proves to be particularly advantageous since typically no stator windings are arranged directly in this region. Thus, this region of the stator can be utilized in an installation space-saving manner for providing a cooling passage. Since, however, in the vicinity of the transition winding portions of the stator windings are often provided which generate particularly much waste heat, particularly much waste heat can also be dissipated from the electric machine by the coolant flowing through the cooling passage by an arrangement of the cooling passage in this region. As a result, an electric machine is thus created in which a cooling mechanism that requires little installation space but is nevertheless effective is implemented for dissipating waste heat from the stator.

An electric machine according to an aspect of the disclosure, in particular for a vehicle includes a rotor which is rotatable about an axis of rotation, by which an axial direction of the electric machine is defined. The machine further includes a stator having stator windings. The machine further includes a coolant distributor space and a coolant collector space arranged axially spaced apart from the same. Here, the coolant distributor space for cooling the stator windings communicates fluidically with the coolant collector space with at least one cooling passage that can be flowed through by a coolant. The stator has stator teeth extending along the axial direction and which are arranged along a circumferential direction spaced apart from one another, which carry the stator windings and which project from a stator body of the stator radially to the inside. Between two stator teeth that are adjacent in the circumferential direction a stator slot each is formed, which includes a radially outer slot zone which, radially to the inside, i.e., away from the stator body, merges into a radially inner slot zone. The transition can be formed in the manner of a step. A radially inner zone width of the radially inner slot zone measured along the circumferential direction is smaller than a radially outer zone width of the radially outer slot zone measured along the circumferential direction. For the thermal coupling, at least one stator winding is embedded in an electrically insulating plastic which is arranged in one of the stator slots. According to an aspect of the disclosure, the at least one cooling passage extends at least in portions in the stator slot, where it is bounded by the electrically insulating plastic and within the stator slot, in a cross-section perpendicularly to the axial direction, arranged at a transition from the radially outer to the radially inner slot zone.

According to an exemplary embodiment, the cooling passage within the stator groove is completely arranged in the radially inner slot zone. In this way, parts of the rotor, in particular the magnet elements provided on the same—typically, these are permanent magnets—can also be cooled as well. Alternatively, the cooling passage can be arranged within the stator slot partly in the radially inner slot zone and partly in the radially outer slot zone. In this case, winding portions of the stator windings located radially further outside are also effectively cooled.

According to another exemplary embodiment, the cooling passage is arranged within the stator slot exclusively in the radially outer slot zone. In this way, the winding portions of the stator windings near the stator body can be effectively cooled.

According to an advantageous further development, the cooling passage within the stator slot is arranged in an end portion of the radially outer slot zone facing the transition. In this way, the winding portions of the stator windings, which are arranged radially inside and radially outside in the stator slot, can be equally effectively cooled.

Practically, the two stator teeth radially inside each have an extension projecting in the circumferential direction and bounding the radially inner slot zone. Here, the cooling passage is at least partially arranged between these two extensions in the radially inner slot zone. In this version, the cooling passage is arranged in the region of the slot opening of the respective stator slot formed open radially to the inside. Thus, the actual stator slot is entirely available for receiving stator windings.

Particularly practically, the cooling passage, in a cross-section perpendicularly to the axial direction, has the geometry of a rectangle with two wide sides and two narrow sides. Also conceivable is the geometry of a trapezium. This measure allows realizing the cooling passage with a large flow cross-section. In particular, the cooling passage can be imparted the advantageous geometry of a flat tube, which in turn allows an installation space-saving arrangement of the cooling passage in the immediate vicinity of the stator winging(s) to be cooled. Also conceivable is the geometry of a trapezium.

Typically, the electrically insulating plastic is formed by a first plastic mass of a first plastic material and by a second plastic mass of a second plastic material.

According to an exemplary embodiment, at least one stator winding is embedded in the second plastic mass of the second plastic material in the stator slot. According to this exemplary embodiment, the second plastic mass with the stator winding embedded therein is at least partly surrounded by the first plastic mass of the first plastic material. In the case that—due to production—not all stator windings can be completely embedded in the second plastic mass, the first plastic mass at any rate prevents any possible electrical short circuit with the electrically conductive material of the stator body. Typically, the thermal heat conductivity of the second plastic material is higher than the thermal heat conductivity of the first plastic material.

According to an advantageous further development, the electrically insulating plastic is partly formed also be a third plastic mass, which completely bounds the cooling passage. In this way it is ensured that the stator windings do not project into the cooling passage where they can come into contact with the coolant flowing through the cooling passage.

In a further exemplary embodiment, the cooling passage is exclusively bounded by the third plastic mass. Alternatively, the cooling passage can be bounded at least partly by the first plastic mass and at least partly by the third plastic mass. With these versions it is also ensured that the stator windings do not project into the cooling passage where they can come into contact with the coolant flowing through the cooling passage.

According to an advantageous further development, a coolant resistance of the third plastic material of the third plastic mass is higher than the coolant resistance of the first or second plastic material of the first or second plastic mass. This further development is recommended when the cooling passage is exclusively bounded by the third plastic mass, so that a degradation of the third plastic mass forming the passage boundary the coolant can be reduced to a minimum.

According to another advantageous further development, a coolant resistance of the third plastic material of the third plastic mass and of the first plastic material of the first plastic mass is higher in each case than the coolant resistance of the second plastic material of the second plastic mass. This further development is recommended when the cooling passage is bounded by the first and the third plastic mass such that a degradation of the first and third plastic mass respective forming the passage boundary by the coolant can be minimized in each case.

Typically, the cooling passage is at least partly, or completely bounded in the circumferential direction by the first plastic mass and radially inside as well as radially outside in each case at least partly, or completely by the third plastic mass. This version is particularly easy to produce and thus cost-effective.

Practically, both the first and also the second and third plastic mass are arranged in each case in at least one stator slot, or in at least two stator slots, particularly typically in all stator slots. In this way, a stable fixing of the stator winding on the stator teeth is achieved. At the same time, it is ensured that no electrically conductive components such as individual stator windings or the plate stack of the stator body comes into contact with the coolant flowing through the cooling passage.

According to an advantageous further development, the first plastic material includes a thermosetting plastic or is a thermosetting plastic. Alternatively or additionally, the second plastic material also includes a thermosetting plastic or is a thermosetting plastic. Alternatively or additionally, the third plastic material includes a thermoplastic or is a thermoplastic. The use of a thermosetting plastic is accompanied by reduced production costs.

A further advantageous further development provides that the first plastic material of the first plastic mass and/or the second plastic material of the second plastic mass and/or the third plastic material of the third plastic mass include a thermosetting plastic or is in each case a thermosetting plastic. The use of a thermosetting plastic is accompanied by reduced production costs.

In a further version, the first plastic material of the first plastic mass and/or the second plastic material of the second plastic mass and/or the third plastic material of the third plastic mass can include a thermoplastic or is in each case a thermoplastic. A use of thermoplastics has various advantages relative to the use of thermosetting plastics. For example, thermoplastics, as a consequence of the reversible shaping process employed during their processing are better recyclable or, compared with thermosetting plastics, are less brittle and have improved damping properties.

According to a further advantageous further development, a fourth plastic mass, which is part of the electrically insulating plastic, can be arranged on an outer circumferential side of the stator body and thus form a plastic coating on the outer circumferential side. In this way, the stator body of the stator typically formed from electrically conductive stator plates can be electrically insulated against the surroundings. In particular, the provision of a separate housing can thus be omitted.

According to another exemplary embodiment, at least one additional cooling passage is formed by at least one aperture, which is arranged in a radially outer end portion of the stator slot located opposite the slot opening. This version can be technically realized particularly easily and thus particularly cost-effectively.

According to an advantageous further development, the first plastic mass surrounds or encases in a cross-section perpendicularly to the axial direction at least one aperture, or all apertures, at least partly, or completely. In this way, the aperture forming the cooling passage can be particularly well coupled thermally to the stator windings.

According to a further advantageous further development, at least one additional cooling passage is present and formed by at least one aperture, which is arranged in the stator body radially outside the stator slot. Said aperture can be realized in the form of a through-bore which is introduced into the stator body with a suitable drilling tool during the course of the manufacture of the electric machine. The provision of a separate tubular body or similar for bounding the cooling passage is not required with this version. This is accompanied by reduced production costs. Particularly typically, multiple such apertures are provided.

In a further exemplary embodiment, the aperture forming the cooling passage is formed open towards the stator slot. Here, said aperture is sealed in a fluid-tight manner by the electrically insulating plastic arranged in the stator slot, or by the first plastic mass. In this version, the apertures are particularly easy to create, which is accompanied by cost advantages during the production.

According to a further exemplary embodiment, the coolant distributor space and/or the coolant collector space are formed by a hollow space that is at least partly, or completely present in the third plastic mass. The provision of a separate encasing or of a housing for bounding the coolant distributor or coolant collector space can thus be omitted. This exemplary embodiment, too, is accompanied by considerable cost advantages.

In another exemplary embodiment, the first and/or the second and/or the third and/or the fourth plastic mass are each an injection molding mass of the first or second or third or fourth plastic material respectively. The use of an injection molding method simplifies and accelerates producing the plastic masses. This results in cost advantages during the manufacture of the electric machine.

Practically, the third plastic mass can axially project out of the stator slot. Thus, the third plastic mass can also be used for the partial bounding of the coolant distributor space or the coolant collector space. In particular, a removal of the part of the second plastic mass projecting out of the stator that is required during the course of the manufacture of the machine is no longer required, which is accompanied by cost advantages during the manufacture of the machine.

A further advantageous configuration therefore provides that the third and/or fourth plastic mass bounds the coolant distributor space and/or the coolant collector space at least partially. Providing a separate boundary for the coolant distributor space or the coolant collector space for example in the form of a housing can be omitted in this exemplary embodiment.

Practically, at least one cooling passage and the first and second plastic mass can be provided in each case in at least one stator slot, or in each existing stator slot, between two stator teeth that are each adjacent in the circumferential direction. In this way it is ensured that waste heat generated during the operation can be dissipated from all existing stator windings.

Practically, the heat conductivity of the second plastic mass is greater in each case than the heat conductivity of the first or third plastic mass. In this way, the waste heat generated by the stator windings can be particularly effectively dissipated.

In a further exemplary embodiment, the at least one stator winding includes two axial end portions on which an additional electrically insulating insulation is arranged. Although the electrically conductive stator windings are usually already surrounded with an electrical insulation in order to prevent that electrical short-circuits are generated upon contact of individual winding portions with one another, it cannot however be ensured that following the production and assembly of the stator windings all these stator windings are continually equipped with such an insulation. In this exemplary embodiment, it is therefore ensured with a redundant, additional electrically insulating insulation that the axial end portions directly bound neither the coolant distributor space nor the coolant collector space. In this way, an undesirable electrical short circuit of the coolant that is present in the coolant distributor space or in the coolant collector space with the electrically conductive stator windings can be prevented.

According to an advantageous further development, the electrically insulating insulation is at least partially, typically completely formed by an insulation varnish. Such an insulation varnish can be applied to the stator windings during the course of the manufacture of the stator by spraying. Alternatively, it is also conceivable, however, to form the additional insulation by way of the electrically insulating plastic, or by way of the third and/or the fourth plastic mass. This version can be produced particularly easily and thus cost-effectively.

The disclosure, furthermore, relates to a vehicle, in particular to a motor vehicle having an electric machine introduced above. The advantages of the electric machine explained above therefore apply also to the vehicle according to an aspect of the disclosure.

Further important features and advantages of the disclosure are obtained from the claims, from the drawings and from the associated figure description by way of the drawings.

It is to be understood that the features mentioned above and still to be explained in the following cannot only be used in the respective combination stated but also in other combinations or by themselves without leaving the scope of the present disclosure.

BRIEF DESCRIPTION OF THE DRAWINGS

The disclosure will now be described with reference to the drawings wherein:

FIG. 3 shows a detail representation of the stator shown in FIG. 2 in the region of a stator slot between two stator teeth that are adjacent in the circumferential direction, FIGS. 4 to 7 are versions of the exemplary embodiment shown in FIG. 3.

DESCRIPTION OF EXEMPLARY EMBODIMENTS

Figure 1:
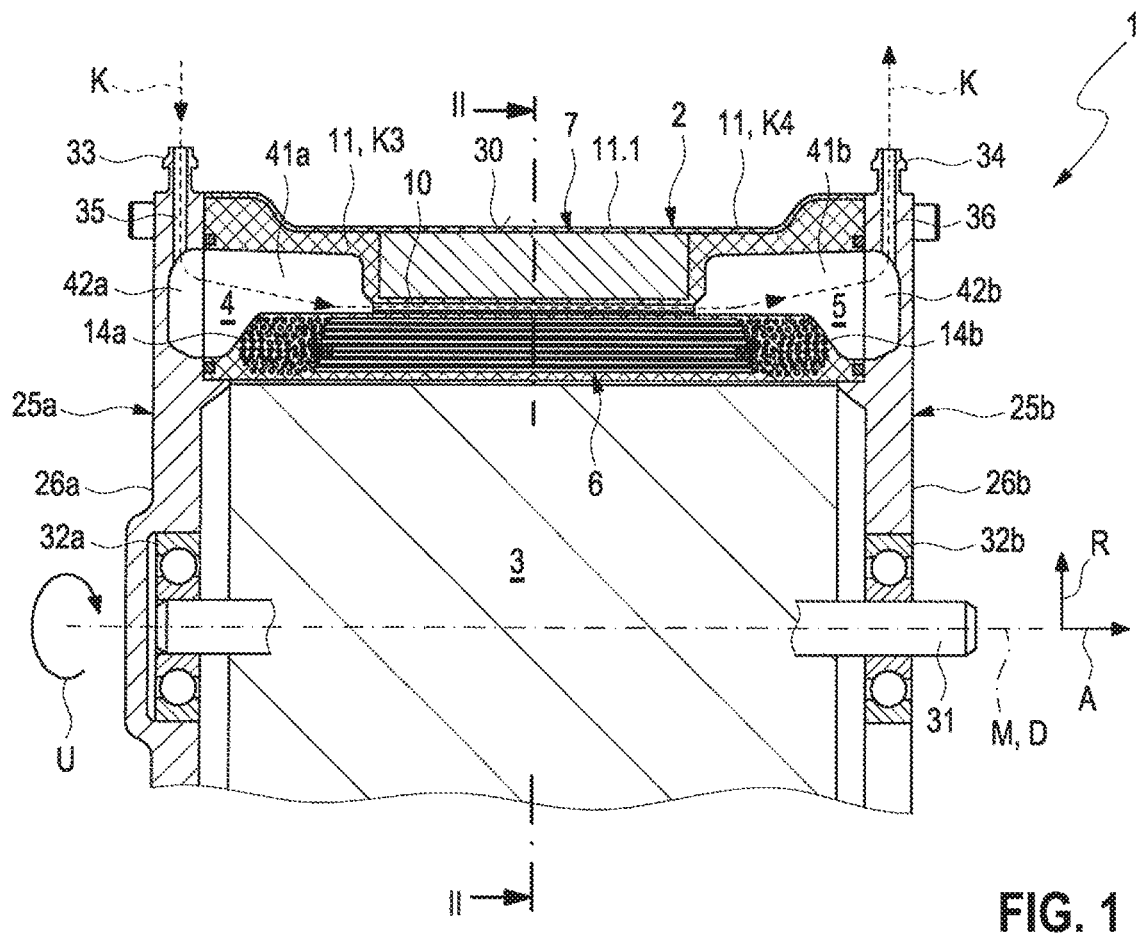
FIG. 1 shows an electric machine in a longitudinal section along the axis of rotation of the rotor according to an exemplary embodiment of the disclosure.
Figure 2:
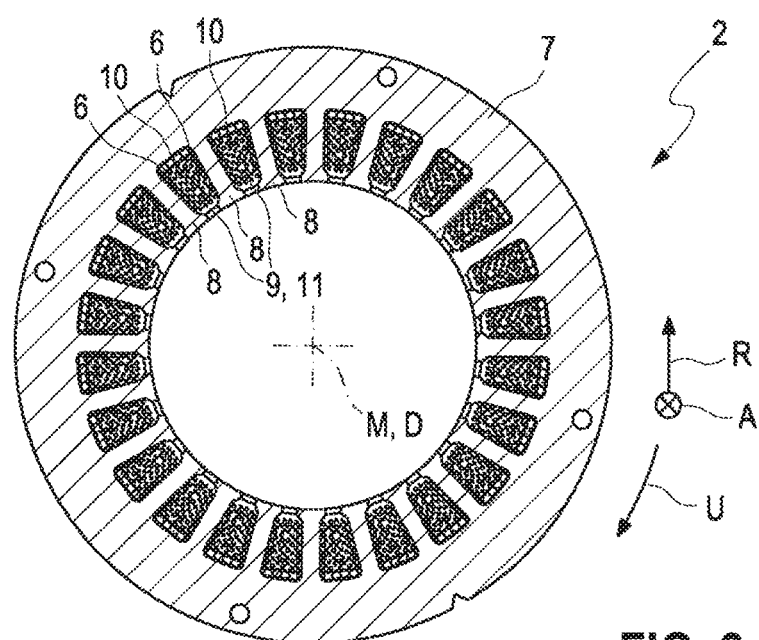
FIG. 2 shows the stator of the electric machine shown in FIG. 1 in a cross-section perpendicularly to the axis of rotation of the rotor.

FIG. 1 illustrates an electric machine 1 according to an exemplary embodiment of the disclosure in a sectional representation. The electric machine 1 is dimensioned such that it can be employed in a vehicle, or in a road vehicle. The electric machine 1 includes a rotor 3 and a stator 2 which are only rough-schematically shown in FIG. 1. For illustration, the stator 2 in FIG. 2 is shown in a cross-section perpendicularly to the axis of rotation D along the section line II-II of FIG. 1 in a separate representation. According to FIG. 1, the rotor 3 includes a rotor shaft 31 and can include multiple magnets which are not shown in more detail in FIG. 1, the magnetic polarization of which changes along the circumferential direction U. The rotor 3 is rotatable about an axis of rotation D, the position of which is defined by the center longitudinal axis M of the rotor shaft 31. Through the axis of rotation D, an axial direction A is defined which extends parallel to the axis of rotation D. A radial direction R stands perpendicularly to the axial direction A. A circumferential direction U rotates about the axis of rotation D.

As is evident from FIG. 1, the rotor 3 is arranged in the stator 2. Thus, the electric machine 1 shown here is a so-called internal rotor machine. However, a realization as a so-called external rotor machine, in which the rotor 3 is arranged outside the stator 2, is also conceivable. The rotor shaft 31 is rotatably mounted on the stator 2 about the axis of rotation D in a first shaft bearing 32a and, axially spaced apart therefrom, in a second shaft bearing 32b.

In addition, the stator 2 includes in known manner multiple electrically energisable stator windings 6 for generating a magnetic field. By way of magnetic interaction of the magnetic field generated by the magnets of the rotor 3 with the magnetic field generated by the stator windings 6, the rotor 3 is set into rotary motion.

From the cross-section of FIG. 2 it is evident that the stator 2 can include an annular stator body 7, for example of iron. In particular, the stator body 7 can be formed of multiple stator body plates (not shown) which are stacked on top of one another along the axial direction A and glued to one another. On the stator body 7, multiple stator teeth 8 are molded on radially inside, which extend along the axial direction A, project away from the stator body 7 radially to the inside and are arranged spaced apart from one another along the circumferential direction U. Each stator tooth 8 carries a stator winding 6. Together, the individual stator windings 6 form a winding arrangement. Depending on the number of magnetic poles to be formed by the stator windings 6, the individual stator windings 6 of the entire winding arrangement can be electrically wired to one another in a suitable manner.

During the operation of the machine 1, the electrically energized stator windings 6 generate waste heat that has to be dissipated from the machine 1 in order to prevent overheating and accompanied by this damage or even destruction of the machine 1. For this reason, the stator windings 6 are cooled with the help of a coolant K, which is conducted through the stator 2 and which absorbs the waste heat generated by the stator windings 6 by way of heat transfer.

In order to conduct the coolant K through the stator 2, the machine 1 includes a coolant distributor space 4, into which, via a coolant inlet 33, a coolant K can be introduced. Along the axial direction A spaced apart from the coolant distributor space 4 a coolant collector space 5 is arranged. The coolant distributor space 4 communicates fluidically with the coolant collection space 5 with multiple cooling passages 10, of which in the representation of FIG. 1 only a single one is noticeable. In a cross-section perpendicularly to the axial direction A which is not shown in the figures, the coolant distributor space 4 and the coolant collector space 5 can each have an annular geometry. Along the circumferential direction U, multiple cooling passages 10 are arranged spaced apart relative to one another, which extend in each case along the axial direction A from the annular coolant distributor space 4 to the annular coolant collector space 5. Thus, the coolant K introduced into the coolant distributor space 4 via the coolant inlet 33 can be distributed over the individual cooling passages 10. Having flowed through the cooling passages 10 and absorbed heat from the stator windings, the coolant K is collected in the coolant collector space 5 and, via a coolant outlet 34 provided on the stator 2, again discharged from the machine 1.

As is evident from the representations of FIGS. 1 and 2, the stator windings 6 are arranged in stator slots 9 which are formed between each two stator teeth 8 that are adjacent in the circumferential direction U. The stator slots 9 are also known to a person of ordinary skill in the art as stator slits, which, just like the stator teeth 8, extend along the axial direction A.

FIG. 3 shows a stator slot 9 formed between two stator teeth 8—in the following, these are also referred to as "stator teeth 8a, 8b"—in a detail representation and in a cross-section perpendicularly to the axial direction A. The stator slot 9 includes a radially outer slot zone 52a, which, radially to the inside, away from the stator body 7, merges into a radially inner slot zone 52b. A radially outer zone width bi of the radially outer slot zone 52a measured along the circumferential direction is greater than a radially outer zone width ba of the radially outer slot zone 52a measured along the circumferential direction U. The transition 52c from the radially outer slot zone 52a into the radially inner slot zone 52b is realized as step 52d in the cross-section perpendicular to the axial direction. In the extension region between the coolant distributor space 4 and the coolant collector space 5 the cooling passage 10 extends in the stator slot 9, where it is bounded by the electrically insulating plastic 11. The two stator teeth 8a and 8b can each include radially inside an extension 51a and 51b projecting in the circumferential direction U and bounding the radially inner slot zone 52b. According to FIG. 3, the cooling passage 10 within the stator slot 9 is completely arranged between these two extensions 51a and 51b in the radially inner slot zone 52b. In the cross-section perpendicularly to the axial direction A, the cooling passage 10 has the geometry of a trapezium with two wide sides 53 and two narrow sides 54. Typically, the cooling passage 10—as exemplarily shown in FIG. 3—has the geometry of a rectangle.

In order to improve the heat transfer of the waste heat generated by the stator windings 6 to the coolant K flowing through the cooling passages 10 an electrically insulating plastic 11 is provided in each case in the stator slots 9 as shown in FIG. 3.

The electrically insulting plastic 11 is formed by a first plastic mass K1 of a first plastic material, by a second plastic mass K2 of a second plastic material and by a third plastic mass K3 of a third plastic material. The first plastic material is a thermosetting plastic. The second plastic material is also a thermosetting plastic. The third plastic material in turn is a thermoplastic. However, it is also conceivable that all three plastic masses are thermoplastics. The three plastic masses K1, K2, and K3 can each be injection molding masses of the electrically insulating plastic 11. The use of an injection molding method simplifies and accelerates the manufacture of the plastic mass.

In the exemplary embodiment, at least one first and one second plastic mass K1 and K2 each are arranged in all stator slots 9. Practically, the heat conductivity of the second plastic mass K2 in each case is greater than the heat conductivity of the first or third plastic mass K1 and K3. In this way, the waste heat generated by the stator windings can be particularly effectively dissipated.

As shown in FIG. 3, the stator windings 6 arranged in the stator slot 9 are embedded in the plastic mass K2 of the second plastic material. The second plastic mass K2 with the stator windings 6 embedded therein is in turn embedded in the first plastic mass K1 of the first plastic material or surrounded by the same.

It is to be understood that the stator winding 6 arranged in the stator slot 9 as shown in FIG. 3, partly belongs in each case to a first stator winding 6a which is supported by the first stator tooth 8a and partly assigned to a second stator winding 6b, which is supported by the second stator tooth 8b. For illustrating this scenario, a virtual separating line 12 is drawn in FIG. 3. The winding wires 13a shown in FIG. 3 left of the separating line 12 belong to the stator winding 6a supported by the stator tooth 8a. The winding wires 13b shown to the right of the separating line 12 belong to the stator winding 6 supported by the stator tooth 8b.

In the example of FIG. 3, the cooling passage 10 is exclusively bounded by the third plastic mass K3 of the electrically insulating plastic 11. However, it is also conceivable that the cooling passage 10 in the circumferential direction U is bounded by the first plastic mass K1 and by the third plastic mass K3 only radially inside and radially outside (not shown).

In the example of FIG. 3, an additional cooling passage 10a is provided in the stator slot 9 in addition to the cooling passage 10. The same is formed by multiple apertures 40—four such apertures 40 are exemplarily shown in FIG. 3 -, which are arranged in a radially outer end portion 55 of the stator slot 9 located opposite the slot opening 52. In the cross-section perpendicularly to the axial direction A shown in FIG. 3, the first plastic mass K1 surrounds or encases the apertures 40 completely in each case. In this way, the apertures 40 forming the cooling passage 10 or the coolant K flowing through the cooling passage can be particularly effectively coupled thermally to the stator windings 6.

As shown in FIG. 3, the apertures 40 are arranged spaced apart from one another along the circumferential direction U and extend in each case along the axial direction A. The apertures 40 can be realized as aperture bores which are introduced into the first plastic mass K1 with a suitable drilling tool. In the cross-section perpendicularly to the axis of rotation D, the apertures 40 can each have the geometry of a rectangle with two wide sides 20 and with two narrow sides 21. A length of the two wide sides 20 amounts to at least two times, preferentially at least four times a length of the two narrow sides 21. Thus, the advantageous geometry of a flat tube is copied.

In the exemplary embodiment shown in FIG. 3, the apertures 40 forming the additional cooling passage 10a are arranged in the plastic mass 11, with respect to the radial direction R, radially outside the stator windings 6. The radial distance of the additional cooling passage 10a to the axis of rotation D of the rotor 3 is thus greater than the distance of the stator winding 6 to the axis of rotation D. However, an arrangement of the cooling passages 10 radially inside is also conceivable. In the cross-section perpendicularly to the axial direction A shown in FIG. 3, the two wide sides 20 of the apertures 40 each extend perpendicularly to the radial direction R.

FIG. 4 shows a version of the example of FIG. 3. In the machine 1 shown in FIG. 4, an additional cooling passage 10c is also provided in addition to the cooling passage 10. The additional cooling passage 10c however is not arranged in the first plastic mass K1, but in the stator body 7 of the stator 2. As is evident from FIG. 4, the apertures 40 forming the cooling passage 10c are arranged in the stator body 7 radially outside the stator slot 9 and with respect to the circumferential direction U between two adjacent stator teeth 8a and 8b. The additional cooling passage 10c can be formed, typically during the course of the manufacture of the stator body 7, by introducing the apertures 40—typically in the form of bores with the help of a suitable drilling tool—into the stator body 7 or into the stator body plates forming the stator body 7.

FIG. 5 shows a version of the exemplary embodiment shown in FIG. 4. In the exemplary embodiment shown in FIG. 5, the apertures 40 forming the additional cooling passage 10c are also arranged in the stator body 7 of the stator 2. In the exemplary embodiment shown in FIG. 5 however—in contrast with the exemplary embodiment shown in FIG. 4—the apertures 40 arranged in the stator body 7 are formed open towards the stator slot 9. The apertures 40 are thus sealed in a fluid-tight manner radially inside, i.e., towards the stator slot 9 by the first plastic mass K1 arranged in the stator slot 9.

FIG. 6 shows a version of FIG. 3. In the example of FIG. 6, the cooling passage 10 is arranged within the stator slot 9 partly in the radially inner slot zone 52b and partly in the radially outer slot zone 52a. The cooling passage 10 thus extends also over the transition 52c between the two slot zones 52a, 52b. The exemplary embodiment shown in FIG. 6 is combinable with the exemplary embodiments shown in FIGS. 4 and 5.

Figure 7:
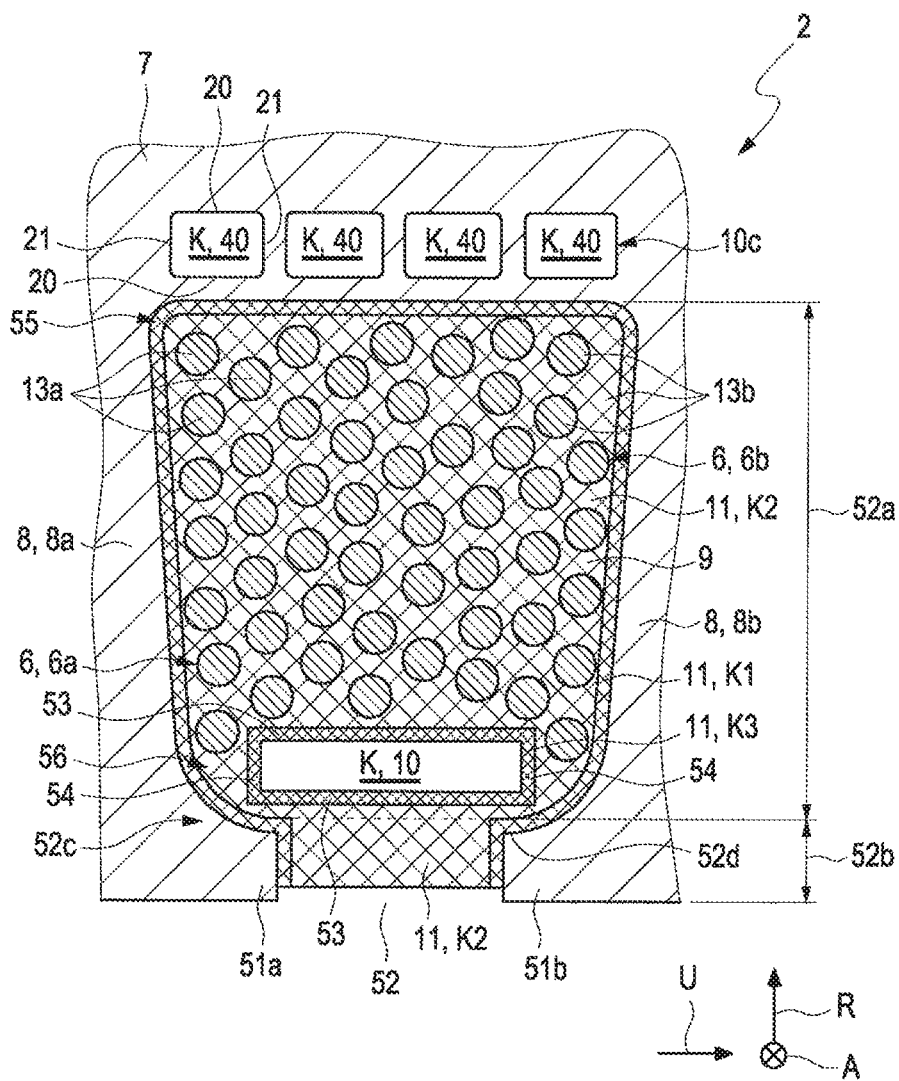

FIG. 7 shows a further version of the exemplary embodiment shown in FIG. 4. In the exemplary embodiment shown in FIG. 7, the cooling passage 10 within the stator slot 9 is exclusively arranged in the radially outer slot zone. The exemplary embodiment shown in FIG. 7 is combinable with the exemplary embodiments shown in FIGS. 3, 5, and 6. In the exemplary embodiment shown in FIG. 7, the cooling passage 10 is arranged within the stator slot 9 in an end portion 56 of the radially outer slot zone 52a facing the transition 53d. The exemplary embodiment shown in FIG. 7 is combinable with the exemplary embodiments shown in FIGS. 3, 5, and 6.

Apart from this, the exemplary embodiments shown in FIGS. 3 to 7 explained above can be combined with one another as desired as far as practical.

For producing the electric machine 1 discussed above, the stator teeth 3 are overmolded with the first plastic mass Kl. Following the overmolding, a mask (not shown) is introduced into the stator slots 9 in that region, in which the cooling passage 10 is to be created. Thus, the mask completely fills the volume of the stator slot 9 which is to form the cooling passage 10 later on. The geometry and position of the cooling passage 10 to be formed are defined by the geometry of the mask and its position in the stator slot 9. The masks can in each case be formed in the manner of a platelet or similar (not shown).

In a further method step the stator windings 6 are arranged on the stator teeth 3. In a further method step, the stator windings 6 are fixed on the stator teeth 3 through at least partial overmolding with the second plastic mass K2.

Following the overmolding with the second plastic mass K2, the masks are again removed from the stator slots 9 in a method step e) so that a hollow space that is present in each case after the removing of the masks can form a coolant passage 10 for a coolant to flow through as desired.

In a further method step, the second plastic mass K2 bounding the coolant passages 10, the stator windings 6 fixed on the stator teeth 3 with the second plastic mass K2 and the surface portions of the stator teeth covered by the masks prior to the removing of the same can be overmolded with the third plastic mass K3.

Following the overmolding with the third plastic mass K3, the cooling passages 10 are bounded either by the first or by the third plastic mass K3. In other words, the overmolding with the third plastic mass K3 is carried out particularly practically in such a manner that following the overmolding, the cooling passages 10 and 10a are no longer bounded directly by the stator windings 6 or by the stator body 2 at any point.

In a further method step, at least one outer circumferential side 30 of the stator body 7 can be overmolded with a fourth plastic mass K4 (see FIG. 1). In this way, the electrically conductive stator body 7 can be electrically insulated relative to the outer surroundings of the electric machine 1.

In the following, reference is again made to FIG. 1. As FIG. 1 clearly corroborates, the third plastic mass K3 that is typically formed in one piece can axially project from the stator slots 9 on both sides. This allows to also embed the coolant distributor space 4 and, alternatively or additionally, the coolant collector space 5 for the thermal coupling to the two axial end portions 14a and 14b of the respective stator winding 6 in the third plastic mass K3, which is arranged axially outside the respective stator slot 9. In this way, an effective heat transfer with the coolant K that is present in the coolant distributor space 4 or coolant collector space 5 can also be established in the region of the axial end portions 14a and 14b of the stator winding 6 concerned which are usually subjected to particular thermal load. This measure allows a particularly effective cooling of the two axial end portions 14a and 14b of the stator winding 6.

Furthermore, the stator 2 with the stator body 7 and the stator teeth 8 according to FIG. 1 is axially arranged between a first and a second bearing shield 25a and 25b.

As is evident from FIG. 1, a part of the coolant distributor space 4 is arranged in the first bearing shield 25a and a part of the coolant collection space 5 in the second bearing shield 25b. The coolant distributor space 4 and the coolant collector space 5 are thus each partly formed by a hollow space 41a and 41b provided in the third plastic mass K3.

Here, the first hollow space 41a is complemented by a hollow space 42a formed in the first bearing shield 25a to make up the coolant distributor space 4. Accordingly, the second hollow space 41b is complemented by a hollow space 42b formed in the second bearing shield 25b to make up the coolant collector space 5. In the exemplary embodiment explained above, the third plastic mass K3 thus bounds the coolant distributor space 4 and the coolant collector space 5 at least partially.

In the first bearing shield 25a, a coolant feed 35 can be formed, furthermore, which fluidically connects the coolant distributor space 4 with a coolant inlet 33 that is provided on the outside, in particular as shown in FIG. 1, on the circumferential side on the first bearing shield 25a. In the second bearing shield 25b, a coolant discharge 36 can be correspondingly formed, which connects the coolant collector space 5 fluidically with a coolant outlet 34 provided on the outside, in particular as shown in FIG. 1 on the circumferential side, on the bearing shield 25b. This makes possible an arrangement of the coolant distributor space 4 or of the coolant collector space 5 in each case radially outside on the first or second end portion 14a and 14b of the stator winding 6 concerned and also in the extension of these end portions 14a and 14b along the axial direction A. The end portions 14a and 14b of the stator windings 6 that are particularly subjected to thermal load during the operation of the machine 1 are also particularly effectively cooled with this measure.

As shown in FIG. 1, a fourth plastic mass K4, which is part of the electrically insulating plastic 11, can be arranged on an outer circumferential side 30 of the stator body 7 and thus form a plastic coating 11.1 on the outer circumferential side 30. In this way, the stator body 7 of the stator 2 typically formed of electrically conductive stator plates can be electrically insulated against the surroundings. In particular, the provision of a separate housing for receiving the stator body 7 can thus be omitted.

Figure 8:
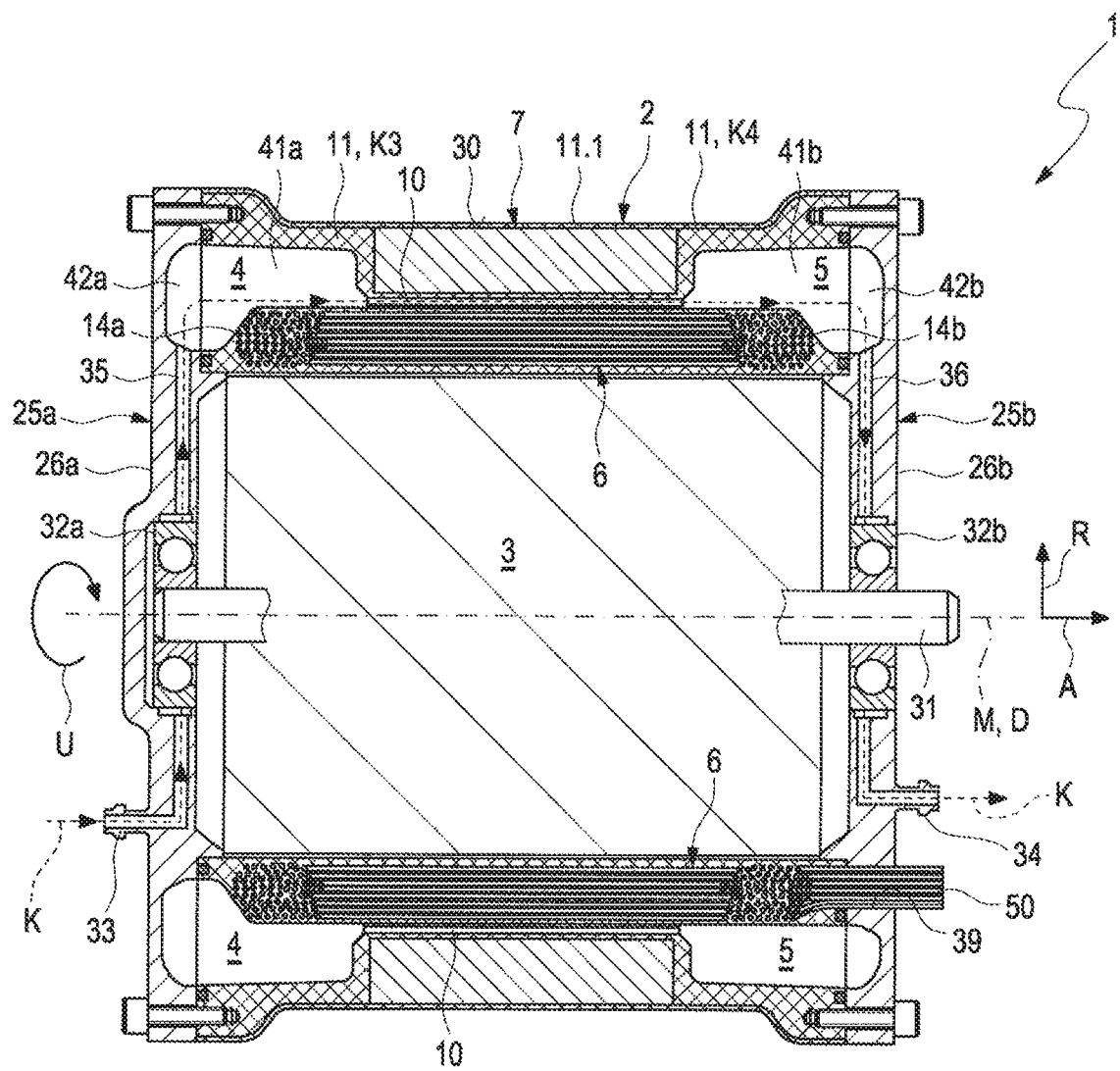
FIG. 8 shows a first version of the electric machine shown in FIG. 1, in which the coolant flowing through the cooling passages is also used for cooling the shaft bearing of the rotor.

FIG. 8 shows a version of the exemplary embodiment shown in FIG. 1. In order to also cool the rotor shaft 31 and the two shaft bearings 32a and 32b during the operation of the machine 1, the coolant feed 35 can be thermally coupled to the first shaft bearing 32a arranged in the first bearing shield 25a. Likewise, the coolant discharge 36 can be thermally coupled to the second shaft bearing 32b arranged in the second bearing shield 25b. A separate cooling device for cooling the shaft bearings 32a and 32b can be omitted in this way, from which cost advantages materialize. In the exemplary embodiment shown in FIG. 8, the coolant inlet 33 and the coolant outlet 34 are provided on the outer end face 26a and 26b of the respective bearing shield 25a and 25b. In the exemplary embodiments shown in FIGS. 8 and 1, the stator windings 6 are arranged radially within the cooling passages 10 along the radial direction R. The stator windings 6 with an electrical connection 50 are led out of the stator 2 to the outside through a feed-through 39 provided in the second bearing shield 25b, such that they can be electrically energized from the outside. The feed-through 39 is radially arranged between the coolant distributor space 4 or the coolant collector space 5 and the axis of rotation D.

Figure 9:
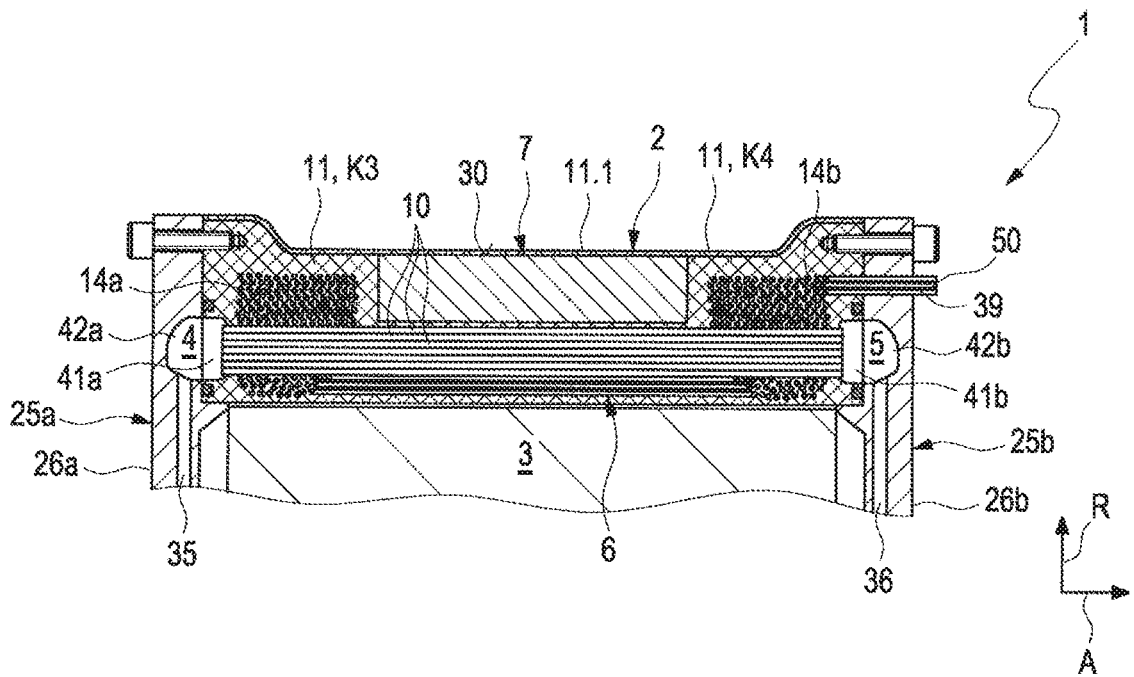
FIG. 9 shows a second version of the electric machine shown in FIG. 1, which requires particularly little installation space.

In the exemplary embodiment shown in FIG. 9, which compared with FIG. 8 shows a simplified embodiment, the coolant distributor space 4 and the coolant collector space 5 are exclusively arranged in the axial extension of the cooling passages 10. This version requires particularly little installation space for the coolant distributor space 4 and for the coolant collector space 5. In the exemplary embodiment shown in FIG. 9, the stator windings 6 are arranged radially within the cooling passages 10 along the radial direction R. The stator windings 6 with an electrical connection 50 are led out of the stator 2 to the outside through a feed-through 39 provided in the second bearing shield 25*b*, such that they can be electrically energized from the outside. With respect to the radial direction, the feed-through 39 is arranged in the second bearing shield 25*b* radially outside the coolant distributor space 4 or the coolant collector space 5.

Figure 10:
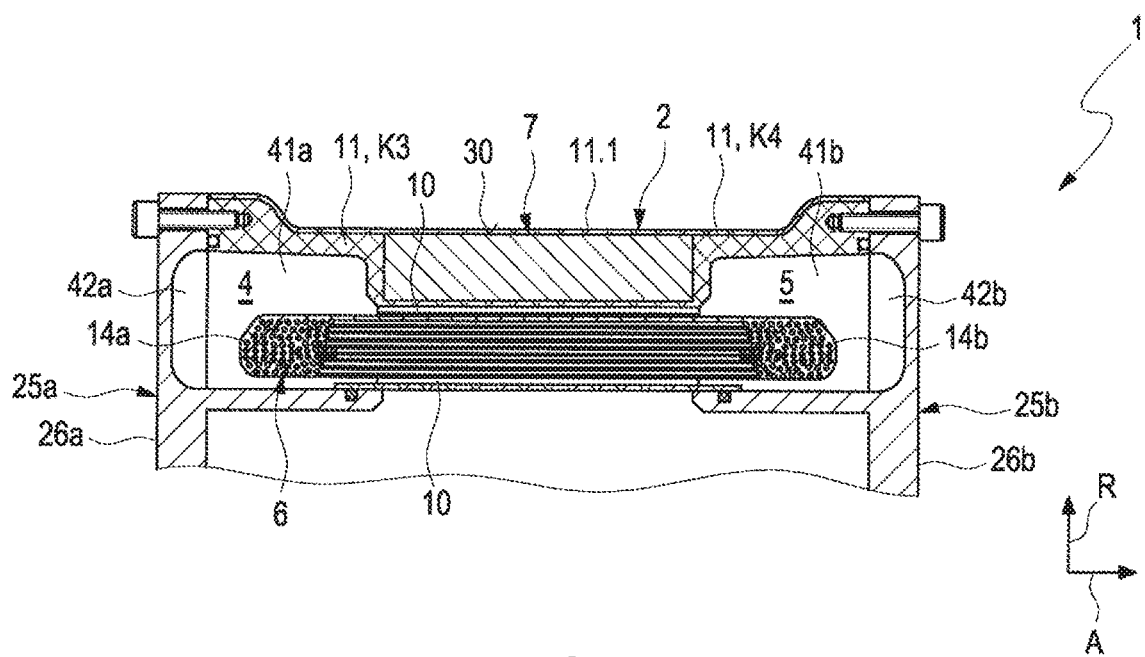
FIG. 10 shows a third version of the machine shown in FIG. 1, which makes possible a particularly effective cooling of the stator windings.

In the exemplary embodiment shown in FIG. 10, a further development of the exemplary embodiment shown in FIG. 8 is shown. In this further development, the coolant distributor space 4 surrounds, in the longitudinal section along the axis of rotation D shown in FIG. 10, the first axial end portion 14*a* of the respective stator winding 6 U-shaped, i.e., axially on the end side and radially inside and radially outside. Accordingly, the coolant collector space 5, in the longitudinal section along the axis of rotation D, surrounds the second axial end portion 14*b* of the respective stator winding 6 U-like, i.e., axially on the end side and radially inside and radially outside. In this version, cooling passages 10 are provided both radially within and also radially outside the winding 6. Thus, the respective stator windings 6 including their axial end portions 14*a* and 14*b* are in direct thermal contact with the coolant K via the cooling passages 10 and the coolant distributor space 4 and the coolant collector space 5. This allows a particularly effective cooling of the stator winding 6 including the axial end portions 14*a* and 14*b* which are exposed to particularly high thermal loads.

On the axial end portions 14*a* and 14*b* of the stator windings 6, an additional electrically insulating insulation (not shown) can be arranged in each case. Although the electrically conductive stator windings are usually already surrounded with an electrical insulation during their manufacture in order to prevent that upon contact of individual winding portions with one another, electrical short-circuits are created. However, it cannot be ensured that following the manufacture and assembly of the stator windings 6, all these stator windings 6 are continuously equipped with such an insulation. With the additional, i.e., redundant electrically insulating insulation introduced here it is ensured that the axial end portions 14*a* and 14*b* directly bound neither the coolant distributor space 4 nor the coolant collector space 5. In this way, an undesirable electrical short-circuit of the coolant present in the coolant distributor space 4 or in the coolant collector space 5 with the electrically conductive stator windings 6 can be prevented.

In the example scenario, the electrically insulating insulation is formed at least by an insulation varnish. Such an insulation varnish can be applied on the stator windings 6 by spraying during the course of the manufacture of the stator 2. However, the additional insulation can also be formed by the electrically insulating plastic 11, for example through the third plastic mass K3 and, alternatively or additionally, through the fourth plastic mass K4.

It is understood that the foregoing description is that of the exemplary embodiments of the disclosure and that various changes and modifications may be made thereto without departing from the spirit and scope of the disclosure as defined in the appended claims.

What is claimed is:

1. An electric machine for a vehicle, the electric machine comprising:
    a rotor, which is rotatable about an axis of rotation, by which an axial direction of the electric machine is defined;
    a stator, which includes stator windings;
    a coolant distributor space;
    a coolant collector space arranged axially spaced apart from the coolant distributor space,
    wherein the coolant distributor space for cooling the stator windings fluidically communicates with the coolant collector space with at least one cooling passage through which a coolant can flow,
    wherein the stator has stator teeth extending along the axial direction and arranged spaced apart from one another along a circumferential direction, which carry the stator windings and which project from a stator body of the stator radially to the inside,
    wherein between two stator teeth that are adjacent in the circumferential direction a stator slot each is formed, which includes a radially outer slot zone which, radially to the inside, away from the stator body, merges into a radially inner slot zone, the radially inner zone width measured along the circumferential direction is smaller than the radially outer zone width of the radially outer slot zone measured along the circumferential direction,
    wherein at least one stator winding for the thermal coupling is embedded in an electrically insulating plastic within the stator slots,
    wherein the at least one cooling passage extends in the stator slot at least in portions, where it is bounded by the electrically insulating plastic and within the stator slot, in a cross-section perpendicularly to the axial direction, and is arranged entirely in an area of the radially inner slot zone,
    wherein the radially outer slot zone and the radially inner slot zone define a transition from the radially outer to the radially inner slot zone, and
    wherein the transition is formed as a step in the cross-section perpendicular to the axial direction.

2. The electric machine according to claim 1, wherein:
    the cooling passage within the stator slot is arranged entirely in the radially inner slot zone, or
    the cooling passage within the stator slot is arranged partly in the radially inner slot zone and partly in the radially outer slot zone.

3. The electric machine according to claim 1, wherein the cooling passage within the stator slot is exclusively arranged in the radially outer slot zone.

4. The electric machine according to claim 1, wherein the cooling passage within the stator slot is arranged in an end portion of the radially outer slot zone facing the transition.

5. The electric machine according to claim 1, wherein:
    the two stator teeth radially inside, include in each case an extension projecting in the circumferential direction and bounding the radially inner slot zone,
    the two extensions face one another along the circumferential direction, and
    the cooling passage is arranged at least partly between these two extensions in the radially inner slot zone.

6. The electric machine according to claim 1, wherein the cooling passage, in a cross-section perpendicularly to the axial direction, has the geometry of a rectangle with two wide sides and two narrow sides.

7. The electric machine according to claim 1, wherein the electrically insulating plastic is formed by a first plastic mass of a first plastic material and by a second plastic mass of a second plastic material.

8. The electric machine according to claim 7, wherein:
in the stator slot at least one stator winding is embedded in the second plastic mass of the second plastic material, the second plastic mass with the stator winding embedded therein is at least partly surrounded and/or bounded by the first plastic mass of the first plastic material, or embedded in the same, and
the thermal conductivity of the second plastic material is higher than the thermal heat conductivity of the first plastic material.

9. The electric machine according to claim 7, wherein the electrically insulating plastic is partly also formed by a third plastic mass, which at least partly bounds the cooling passage.

10. The electric machine according to claim 9, wherein:
the cooling passage is exclusively bounded by the third plastic mass, or
the cooling passage is at least partly bounded by the first plastic mass and at least partly by the third plastic mass.

11. The electric machine according to claim 10, wherein a coolant resistance of the third plastic mass is higher than the coolant resistance of the first or second plastic mass.

12. The electric machine according to claim 10, wherein the coolant resistance of the first and of the third plastic mass is higher in each case than the coolant resistance of the second plastic mass.

13. The electric machine according to claim 12, wherein the cooling passage in the circumferential direction, is bounded at least partly, or completely, by the first plastic mass and radially inside and radially outside in each case at least partly, or completely by the third plastic mass.

14. The electric machine according to claim 9, wherein the heat conductivity of the second plastic mass is higher in each case than the heat conductivity of the first or third plastic mass.

15. The electric machine according to claim 9, wherein the heat conductivity of the second plastic mass is the same in each case as the heat conductivity of the first or third plastic mass.

16. The electric machine according to claim 7, wherein in at least two stator slots, or in all stator slots, the first and also second and also third plastic mass is arranged in each case.

17. The electric machine according to claim 7, wherein the first plastic material of the first plastic mass and/or the second plastic material of the second plastic mass and/or the third plastic material of the third plastic mass includes a thermosetting plastic or is a thermosetting plastic.

18. The electric machine according to claim 7, wherein the first plastic material of the first plastic mass and/or the second plastic material of the second plastic mass and/or the third plastic material of the third plastic mass includes a thermoplastic or is a thermoplastic.

19. The electric machine according to claim 7, wherein:
the first plastic material includes a thermosetting plastic or is a thermosetting plastic, and/or
the second plastic material includes a thermosetting plastic or is a thermosetting plastic, and/or
the third plastic material includes a thermosetting plastic or thermoplastic or is a thermosetting plastic or thermoplastic.

20. The electric machine according to claim 7, wherein at least one of a third plastic mass and a fourth plastic mass at least partly bound at least one of the coolant distributor space and the coolant collector space.

21. The electric machine according to claim 1, wherein on an outer circumferential side of the stator body a fourth plastic mass of a fourth plastic material is arranged.

22. The electric machine according to claim 1, wherein at least one additional cooling passage is formed by at least one aperture, which is arranged in a radially outer end portion of the stator slot located opposite the slot opening.

23. The electric machine according to claim 22, wherein a first plastic mass, in a cross-section perpendicularly to the axial direction, at least partly, or completely surrounds or encases at least one aperture or all apertures.

24. The electric machine according to claim 1, wherein at least one additional cooling passage is present and formed by at least one aperture, which is arranged in the stator body radially outside the stator slot.

25. The electric machine according to claim 24, wherein the aperture forming the additional cooling passage and arranged in the stator body is formed open towards the stator slot and is sealed in a fluid-tight manner by the electrically insulating plastic arranged in the stator slot, or by a first plastic mass.

26. The electric machine according to claim 1, wherein the coolant distributor space and/or the coolant collector space, for the thermal coupling to the stator windings, are at least partly arranged in the electrically insulating plastic, or in a third plastic mass.

27. The electric machine according to claim 1, wherein at least one of a first plastic mass, a second plastic mass, a third plastic mass, and a fourth plastic mass are formed by an injection molding mass of at least one of a first plastic material, a second plastic material, a third plastic material, and a fourth plastic material, respectively.

28. The electric machine according to claim 1, wherein a second plastic mass projects axially from the stator slot.

29. The electric machine according to claim 1, wherein in at least one, or in each stator slot, between two stator teeth adjacent in the circumferential direction, at least one cooling passage and the electrically insulating plastic each are present.

30. The electric machine according to claim 1, wherein the at least one stator winding, or all stator windings, includes/include two axial end portions on which an additional electrically insulating insulation is arranged, such that the axial end portions directly bound neither the coolant distributor space nor the coolant collector space.

31. The electric machine according to claim 30, wherein the electrically insulating insulation is at least partly, or completely formed by at least one of an insulation varnish and the electrically insulating plastic, or at least one of a third plastic mass and a fourth plastic mass.

32. The vehicle, comprising:
at least one electric machine according to claim 1,
wherein the vehicle is a motor vehicle.

* * * * *